United States Patent [19]

Sears

[11] 4,202,023
[45] May 6, 1980

[54] OVERLOAD PROTECTOR
[75] Inventor: Kay G. Sears, Keyport, N.J.
[73] Assignee: Entron, Inc., Morganville, N.J.
[21] Appl. No.: 858,371
[22] Filed: Dec. 7, 1977
[51] Int. Cl.² .............................................. H02H 3/08
[52] U.S. Cl. ........................................ 361/18; 361/71; 361/93
[58] Field of Search .................... 361/18, 101, 59, 71, 361/74, 75, 93; 323/9, 22 T; 307/318

[56] References Cited
U.S. PATENT DOCUMENTS

| | | | |
|---|---|---|---|
| 3,100,863 | 8/1963 | McCullough | 323/22 T |
| 3,182,246 | 5/1965 | Lloyd | 361/18 X |
| 3,240,997 | 3/1966 | Burgi et al. | 361/18 |
| 3,317,817 | 5/1967 | Gershen | 307/318 X |
| 3,366,871 | 1/1968 | Connor | 361/18 X |
| 3,624,490 | 11/1971 | Fisher | 323/9 |
| 3,654,518 | 4/1972 | Phelps et al. | 361/101 |
| 3,748,569 | 7/1973 | Frank et al. | 361/59 X |

Primary Examiner—Patrick R. Salce
Attorney, Agent, or Firm—Michael Ebert

[57] ABSTRACT

A rapid-response overload protector interposed between a voltage source and a load powered thereby, the protector effectively decoupling the load from the source when the current drawn thereby exceeds a predetermined limit indicative of an overload condition. The protector includes an automatic resetting stage that periodically samples the state of the load and acts to restore the normal supply of current thereto when the current drawn by the load during the sampling interval falls below the limit.

1 Claim, 1 Drawing Figure

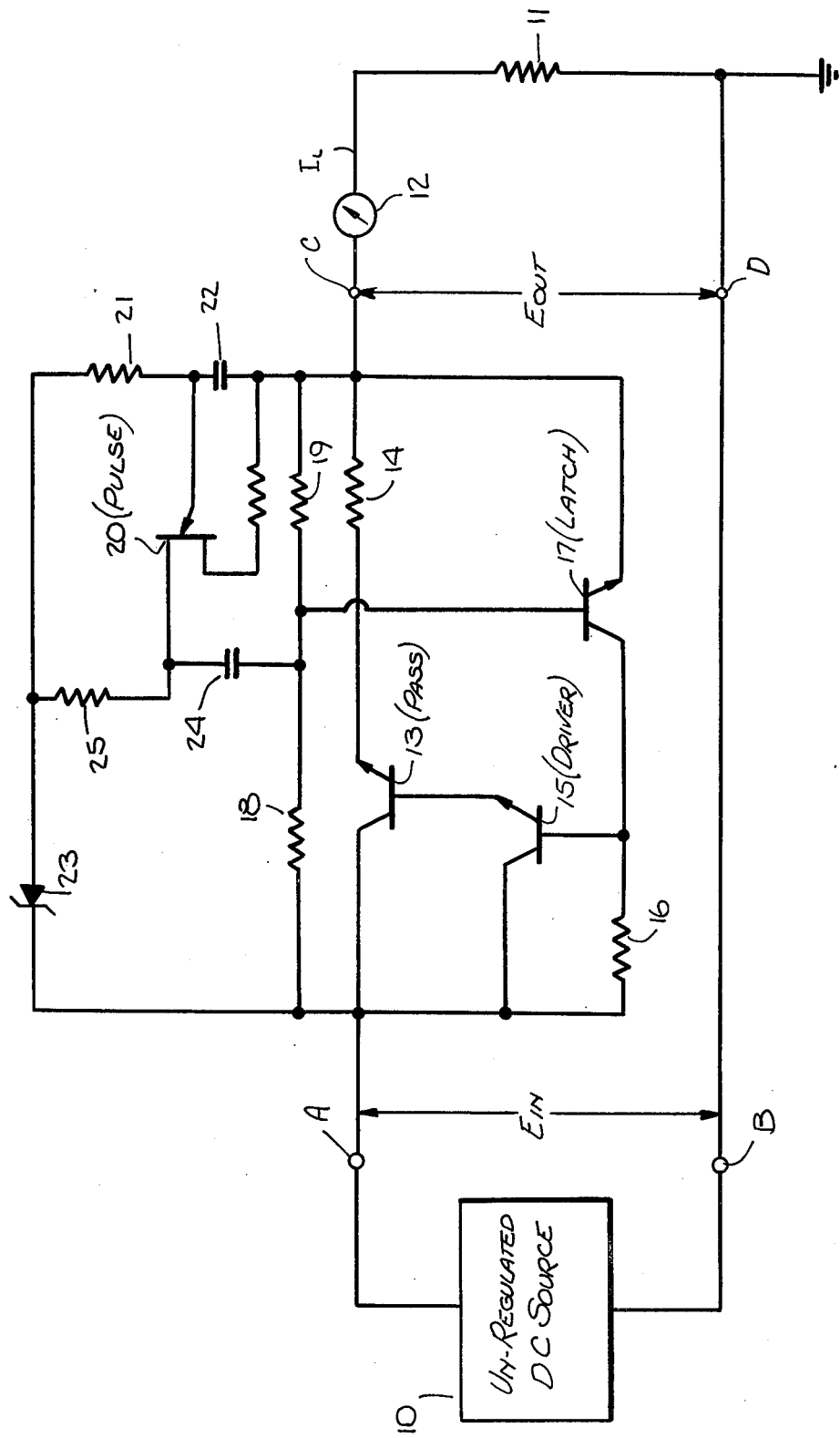

OVERLOAD PROTECTOR

BACKGROUND OF INVENTION

This invention relates generally to an overload protector interposed between a voltage source and a load powered thereby, the protector functioning to effectively decouple the load from the source when the current drawn by the load exceeds a predetermined limit.

In many electrical circuit applications, the need exists for some form of current regulation to prevent excessive current flow from a power supply to a load. Current control is of particular importance in connection with electrical devices where a fault condition such as a shorted circuit may have destructive effects. Such destruction can take place in a matter of microseconds; hence fuses and electro-mechanical circuit-breakers have too slow a response time to afford the desired protection.

In one known form of rapid-response overload protector, an unregulated d-c input voltage from a primary source is applied to the load through a pass transistor in series with a current-limiting resistor to form a current-control network. The load may be any electrical device which draws current from the source, and the function of the protector is to cut off current flow to the load immediately when an abnormal condition arises, such as a shorted circuit.

In the protector, base current for the pass transistor is provided by a driver transistor connected to a latching transistor whose base is connected to the tap of a voltage divider shunted across the current-control network. Under normal load conditions, the driver transistor conducts to render the pass transistor conductive, whereas the latching transistor is biased to its non-conductive state because the voltage drop across the voltage divider is low. When, however, the current delivered to the load exceeds a predetermined limit indicative of an overload condition, the resultant voltage drop across the limiting resistor in series with the pass transistor increases to a point that biases the pass transistor to its "off" or non-conductive state.

As a consequence, the voltage drop across the divider becomes high and acts to apply a voltage to the latching transistor that renders it conductive. The resultant conduction of the latching transistor serves to bias the driver transistor to its "off" state, and this in turn renders the pass transistor non-conductive.

Thus when an overload current is drawn by the load, the resultant drop then produced across the limiting resistor cuts off the pass transistor, and this "off" condition is maintained by a latching action. In the latching state, current to the load is reduced to a very low value, this condition continuing as long as there exists a voltage drop between the voltage applied to the input of the protector and the voltage across the load or until primary power is removed.

The drawback of this form of protector arrangement is that an overload condition giving rise to a latching operation may be a transient or a condition of relatively brief duration which thereafter clears up. But because of the latching action, the protector continues to effectively decouple the supply from the load even though the load is then in an acceptable state.

In some circumstances, this drawback may have serious consequences; for when the electrical device which constitutes the load carries out a vital function, it is important that interruptions in the current supplied to the device be confined to those periods in which the device is not properly operative, as reflected by an overload condition, and that as soon as the device is properly operative, that it be fully powered to resume its normal operation.

The following patents, which relate to prior art forms of overload protectors, are of interest in connection with the present invention: U.S. Pat. Nos. 3,624,490; 3,597,657; 3,338,316; 3,026,469; 3,445,751 and 3,697,861.

SUMMARY OF INVENTION

In view of the foregoing, the main object of this invention is to provide an improved overload protector which effectively decouples a load from a source supplying power thereto when the current drawn by the load exceeds a predetermined limit indicative of an overload condition and which automatically restores power to the load when the abnormal condition clears up.

More particularly, it is an object of this invention to provide a protector of the above type which includes an automatic resetting stage that acts periodically to sample the state of the load and to restore the normal supply of current thereto when the current drawn by the load falls below the predetermined limit.

Yet another object of this invention is to provide an overload protector of relatively simple and inexpensive design which operates reliably and efficiently without dissipating a large amount of power.

Briefly stated, these objects are attained in an overload protector in accordance with the invention in which the voltage from an unregulated d-c source is applied to a load through a current-regulating pass transistor connected in series with a current-limiting resistor to form a current-control network. Base current for the pass transistor is provided by a driver transistor that is connected to a latching transistor. The base of the latching transistor is connected to a tap on a voltage divider shunted across the current-control network.

Under normal load conditions, the driver transistor conducts to render the pass transistor conductive to supply current to the load through the current-limiting resistor. Because the voltage drop across the voltage divider is then low, the latching transistor whose base is connected to the tap of the divider is biased to its "off" state. But when the current delivered to the load rises above a predetermined limit indicative of an overload condition, the resultant voltage drop across the limiting resistor increases to a point that biases the pass transistor "off." As a consequence, the voltage drop across the voltage divider becomes high and acts to apply a voltage to the base of the latching transistor, rendering it conductive.

The resultant conduction of the latching transistor acts to bias the driver transistor to its "off" state, and this in turn biases the pass transistor "off." In this latching state, current to the load is reduced to a very low value so that the load is effectively decoupled from the supply.

To effect automatic resetting, a slow speed pulser formed by a pulse transistor and an R-C network is connected through a zener diode across the voltage divider. The output of the pulser is applied to the base of the latching transistor. When under normal operating conditions the voltage across the divider is low, the zener diode is non-conductive and the pulser is quiescent.

But when an overload occurs, causing the voltage across the divider to reach its maximum value, this renders the diode conductive to activate the pulser and apply a pulse to the base of the latching transistor which turns it "off," thereby releasing the driver transistor and the pass transistor and automatically restarting the delivery of power to the load. But if the overload still exists, the protector again acts to interrupt flow.

Thus the pulses from the pulser serve to periodically restart the protector which in turn proceeds to turn off as long as an excessive current is sensed thereby. This periodic sampling of the load condition continues until such time as the overload condition is cleared up, at which point the system resumes its normal operation with the pulser again quiescent.

OUTLINE OF DRAWING

For a better understanding of the invention as well as other objects and further features thereof, reference is made to the following detailed description to be read in conjunction with the accompanying drawing, wherein the single figure is a schematic circuit diagram of an overload protector that includes an automatic resetting stage in accordance with the invention.

DESCRIPTION OF INVENTION

Referring now to the drawing, there is shown an overload protector, in accordance with the invention, interposed between an unregulated d-c power supply 10 and an electrical device represented by a load resistor 11. The voltage applied to the input of the overload protector at terminals A and B is $E_{in}$, and the voltage appearing at the output thereof at terminals C and D is $E_{out}$. The current $I_L$ drawn by load 11 is indicated by ammeter 12.

Connected between terminals A and C is a current-control network formed by pass transistor 13 connected in series with a current-limiting resistor 14 whose value is low and chosen to limit the amount of current which is passed by the current-regulating transistor. Associated with the current-regulating pass transistor 13 is a driver transistor 15 whose emitter is connected to the base of the pass transistor and whose collector is connected to the collector of the pass transistor, the driver transistor supplying base current to the pass transistor. The base of transistor 15 is connected to the junction of a resistor 16 and a latching transistor 17 of a latching network connected across the current-control network 13-14.

Also shunted across current-control network 13-14 is a voltage divider formed by resistor 18 in series with resistor 19, the junction of the resistors which is the tap of the voltage divider being connected to the base of latching transistor 17.

At turn-on, pass transistor 13 and driver transistor 15 are conductive, both transistors being then biased "on." The reason driver transistor 15 is biased "on" is because latching transistor 17 is then biased "off" and in this state functions as a large resistance value in series with resistor 16.

The voltage drop developed across current-limiting resistor 14 is not sufficient to affect the conduction state of pass transistor 13 at normal current values below a predetermined limit. And when pass transistor 13 is conductive, the voltage drop across divider 18-19 is low, and latching transistor 17, whose base is connected to the tap of the voltage divider, is biased to its "off" state.

When the current delivered to load 11 reaches an excessive or overload value above the predetermined limit or trip point, the voltage drop then developed across current-limiting resistor 14 is high enough to bias pass transistor 13 to its "off" state. When this happens, the voltage drop across divider 18-19 increases sharply, to render latching transistor 17 conductive, thereby reducing its effective resistance and applying a bias to the base of driver transistor 15 which turns this transistor "off." Driver transistor 15 then biasing pass transistor 13 "off."

In this latched condition, pass transistor 13 is biased to its non-conductive state with almost all of the supply voltage appearing between collector and emitter of the pass transistor. In this condition, the current delivered to the load is reduced to a very low value. The dissipation in pass transistor 13 is then very low even should there be a short circuit in the load. Maximum dissipation in pass transistor 13 occurs at current levels just under the trip point which is determined by the ohmic value of limiting resistor 14. But in this condition, pass transistor 13 is saturated; hence dissipation is still relatively low.

Associated with the overload protector is an automatic resetting stage which includes a slow-speed pulser formed by a transistor 20, and an R-C network constituted by resistor 21 and a capacitor 22. Voltage from across voltage divider 18-19 is supplied to the pulser through a zener diode 23, and the pulses are delivered to the base of latching transistor 17 through a coupling capacitor 24.

Under normal operating conditions, the voltage drop across voltage divider 18-19 is low, and zener diode 23 does not avalanche. Hence no current is supplied to pulser transistor 20 or its associated circuitry, and no pulses are generated.

When latching transistor 17 is rendered operative because of an overload condition or a short circuit and pass transistor 13 is then biased "off," the voltage drop across voltage divider 18-19 attains its maximum value, and this causes zener diode 23 to avalanche and to supply current which charges capacitor 22 through resistor 21.

When the charge voltage across capacitor 22 reaches a critical level, pulse transistor 20 is rendered conductive to discharge capacitor 22, thereby generating a negative-going pulse across resistor 25. This pulse is applied through capacitor 24 to the base of latching transistor 17.

This pulse acts to turn latching transistor 17 "off" which renders pass transistor 13 conductive and allows current to again flow through current-limiting resistor 14. But the load condition is still the same, and the current flow through resistor 14 will be excessive and exceed the trip point. As a result, the circuit will again latch, zener diode 23 will again avalanche and another pulse will be generated. If, however, the overload condition has cleared up, as indicated by normal current through current-limiting resistor 14, latching transistor 17 will remain "off", pass transistor 13 will remain "on" and normal current will be supplied to load 11.

Thus the load condition, as reflected by the current through limiting resistor 14, can be sampled at a rate determined by the time constant of R-C network 21-22, the sampling taking place periodically and continuing until the overload condition is removed or until primary power is cut off.

When using higher voltages, it is sometimes necessary to bypass resistor 14 to prevent turn-off of pass transistor 13 at initial turn-on, and when test probes are used to measure current voltage.

While there has been shown and described a preferred embodiment of an overload protector in accordance with the invention, it will be appreciated that many changes and modifications may be made therein without, however, departing from the essential spirit thereof.

I claim:

1. An overload protector interposed between a d-c voltage source and a load supplied thereby, said protector comprising:

A. a current-control network constituted by a pass transistor connected in series with a current-limiting resistor between the source and the load;

B. a latching network connected across the control network formed by a resistor in series with a latching transistor;

C. a driver transistor connected to the base of the pass transistor, the base of the driver transistor being connected to the junction of said resistor and latching transistor of said latching network;

D. a voltage divider connected across the control network, said divider formed by two resistors connected in series and having a tap connected to the base of the latching transistor to render the latching transistor conductive when the voltage across the divider is high, said driver transistor and said pass transistor being conductive uner normal load conditions below a predetermined limit to supply current to the load, in which condition the voltage across the divider is low and said latching transistor is then non-conductive, the voltage drop across said current-limiting resistor reaching a value when said current exceeds said limit under overload conditions to bias said pass transistor to cut-off, at which point the voltage drop across said divider becomes high to apply a bias to the base of said latching transistor to render it conductive and thereby bias the driver transistor to its "off" state, which driver transistor then biases the pass transistor to its "off" state; and E. an automatic resetting stage coupled to said control network to periodically sample the state of said load and to restore said pass transistor to its "on state" and to restore the normal supply of current to said load when the current drawn during a sampling interval falls below said limit, said resetting stage including a slow speed pulser which is connected to said control network through a diode which is rendered conductive to activate said pulses when said pass transistor is rendered non-conductive, which applies a pulse to the base of the latching transistor when an overload condition is sampled to render said latching transistor non-conductive and thereby allow current to again flow in the current-limiting resistor, said pulses being formed by a pulse transistor connected to an R-C network which is charged through said conductive diode and discharged by said pulse transistor when the charge attains a critical value to produce a pulse, said pulse being applied to the base of the latching transistor through a capacitor.

* * * * *